g (x)= -5, 0, 2, 9, 10, 13

Feb. 27, 1973 SHIH YUNG TONG 3,718,905

ERROR CORRECTING SYSTEMS UTILIZING ONE-HALF OPTIMUM DIFFUSE CODES

Filed Sept. 1, 1971 5 Sheets-Sheet 4

| | | | | | | | | | | | | | |
|---|---|---|---|---|---|---|---|---|---|---|---|---|---|
| INFORMATION SIGNALS GENERATED BY THE ENCODER OF FIG. 4 | I | 0 | 0 | 0 | 1 | 1 | 0 | 0 | 0 | 0 | 0 | 0 | 0 |
| PARITY SIGNALS GENERATED BY THE ENCODER OF FIG. 4 FOR I ABOVE | P | 1 | 1 | 0 | 1 | 1 | 0 | 0 | 1 | 0 | 1 | 0 | 0 |
| RECEIVED INFORMATION SIGNALS INCLUDING ERRORS | I* | 0 | 0 | 0 | 0 | 0 | 0 | 0 | 0 | 0 | 0 | 0 | 0 |
| PARITY SIGNALS INCLUDING ERRORS RECEIVED BY DECODER OF FIG. 4 | P* | 1 | 1 | 0 | 1 | 0 | 0 | 0 | 1 | 0 | 1 | 0 | 0 |

FIG. 7

SAMPLES OF OPTIMUM RATE 1/2 DIFFUSE CODES

| | t BITS | $n_e$ BITS | $N_A$ BLOCKS | $B_m$ BLOCKS | NON-ZERO TERM OF GENERATOR POLYNOMIAL | ORTHOGONALIZATION RULE |
|---|---|---|---|---|---|---|
| | 2 | 11 | 4B+4 | 2 | -B-1, 0, 2B, 2B+1 | (2B+1) + (-B) |
| M=2, m=1 | 3 | 22 | 4B+12 | 3 | -B-2, 0, 2, 2B+3, 2B+4, 2B+7 | (2B+4) + (-B-1),<br>(2B+7) + (-B+1) + (-B+2) |
| M=2, m=2 | 4 | 37 | 4B+27 | 9 | -B-2, 0, 4, 10, 2B+14, 2B+15, 2B+17, 2B+22 | (2B+15) + (-B-1),<br>(2B+17) + (-B) + (-B+1),<br>(2B+22) + (-B+3) + (-B+5)<br>+ (-B+6) |
| | 5 | 56 | 4B+53 | 17 | -B-4, 0, 8, 19, 20 2B+29, 2B+31, 2B+34 2B+38, 2B+44 | (2B+31) + (-B-2),<br>(2B+34) + (-B-1) + (-B+1),<br>(2B+38) + (-B) + (-B+3) + (-B+5),<br>(2B+44) + (-B+2) + (-B+6)<br>+ (-B+9) + (-B+11) |
| | 6 | 79 | 4B+96 | 33 | -B-6, 0, 1, 23, 34, 38 2B+55, 2B+57, 2B+62, 2B+65, 2B+71, 2B+83 | (2B+57) + (-B-4), (2B+62) + (-B-1) + (-B+1),<br>(2B+65) + (-B-3) + (-B+2) + (-B+4),<br>(2B+71) + (-B) + (-B+3) + (-B+8) +<br>(-B+10), (2B+83) + (-B+6) + (-B+12)<br>+ (-B+15) + (-B+20) + (-B+22) |

United States Patent Office 3,718,905
Patented Feb. 27, 1973

3,718,905

ERROR CORRECTING SYSTEMS UTILIZING ONE-HALF OPTIMUM DIFFUSE CODES

Shih Yung Tong, Middletown, N.J., assignor to Bell Telephone Laboratories, Incorporated, Murray Hill, N.J.

Filed Sept. 1, 1971, Ser. No. 176,823
**Int. Cl. G06f *11/12***
U.S. Cl. 340—146.1 AQ 9 Claims

ABSTRACT OF THE DISCLOSURE

Sequences of information bits, encoded in an orthogonalizable convolutional code of rate ½ and transmitted via a communication channel, are decoded to correct *t* random errors and bursts of B blocks where each block is 2 bits in length. The interconnections between an information bit shift register in the encoder and decoder and their respective parity check bit generating circuits and between a syndrome register and a majority logic circuit in the decoder are specified by relatively simple formulas which are functions of *t* and B. The apparatus of the present invention is optimized for correcting random errors.

BACKGROUND OF THE INVENTION

(1) Field of the invention

This invention relates to a new class of codes and, more particularly, to error correcting systems utilizing those codes for automatically correcting random and burst errors in data transmission systems.

(2) Description of the prior art

With the almost phenomenal increase in the use of computers and other data processing equipment, there has arisen a concomitant need for more accurate means of transmitting and processing that digital data. For example, a large variety of inexpensive "plug-in" terminal units are available by means of which a user can gain access to a centrally located computer on a time-sharing basis. Typically, the user communicates with a computer via his terminal equipment, his telephone and the related telephone transmission line, each of which is a potential source of errors. Accuracy, in this instance, must nonetheless be ensured to guarantee privacy among time-sharing users. That is, access to confidential information is often keyed to the submission of a code number or word. Obviously, errors in one submitted code word or number may permit access by one user to information belonging to another user. It is also apparent that increased system accuracy reduces the occurrence of costly time-consuming errors.

A great many error detection and correction techniques are available which provide the required level of accuracy. These techniques are usually classified according to the type or types of errors which they correct, that is, random errors only, burst errors only or combined random and burst errors. It is this last combination-type error correcting capability provided by the present invention.

In general, there are two approaches for correcting errors in systems susceptibl eto both random and burst errors. The first such approach involves the specification of different decoding strategies for burst and random errors. The success of such an approach depends on the existence of a sharp distinction between the burst and random errors such as exists, for example, in the troposcatter channel. Typical examples of this first approach are described in A. H. Frey, Jr., "Adaptive Decoding Without Feedback," IBM Technical Report, TR 48.67.001, Nov. 8, 1967; M. J. B. Golay, "Notes on Digial Coding," Proceedings of the IRE (correspondence), volume 37, page 657, 1949; A. Kohlenberg and G. D. Forney, Jr., "Convolutional Coding for Channels With Memory," IEEE Transactions Information Theory, volume IT, pages 618, to 626, September 1968. The last reference, which particularly specifies convolutional orthogonalizable codes, is J. L. Massey's "Threshold Decoding," Cambridge, Mass., MIT Press, 1963.

A second approach for correcting random and burst errors is the specification of a single decoding algorithm for both types of error. Such an approach depends on the choice of a suitable code that corrects both random and burst errors efficiently. Although in this second approach there is no need to distinguish burst from random errors, such a code generally requires more guard space between errors for burst error correction and is, in addition, a less powerful random error correcting code. One can, of course, use the technique of interleaving a random error correcting code to effect correction of both types of errors. In general, however, such an interleaved code requires an even larger guard space for burst error correction than that required with the use of a special code designed for the compound channel, that is, one susceptible to both random and burst errors. Examples of such special codes are the Reed-Solomon codes described in an article by J. S. Reed and G. Solomon entitled "Polynomial Codes Over Certain Finite Fields," SIAM J. volume 8, pages 300 to 306, 1960.

The class of codes of the preferred embodiment of the present invention follows this second decoding strategy; that is, only one decoding algorithm is specified for correction of both types of errors. Further, the codes have large guard space requirements and require fewer shift register stages as will be seen in the discussion of the preferred embodiment of the present invention below.

Accordingly, it is an object of the present invention to provide efficient and economical apparatus for correcting both random and burst errors in a data transmission system.

It is another object of the present invention to provide a random and burst error-correcting system having a small receiving terminal storage requirement.

Still another object of the present invention is to provide optimum random and burst error correcting systems easily determinable from simple specifications. More particularly, it is an object of the present invention to provide an optimized error correction system involving modifications to the error correction circuitry which modifications are specified by the parameters of a simple relatively straightforward equation.

SUMMARY OF THE INVENTION

These and other objects of the present invention are realized in a specific illustrative embodiment which includes both a transmitting and receiving terminal connected by means of a noisy communication channel. Information sequences are encoded at the transmitting terminal with an orthogonalizable convolutional code of rate ½ which is capable of correcting *t* random errors and burst errors of B blocks, where a block is 2 bits in length. As in the typical prior art system, a number of which are mentioned above, the encoder and decoder of the transmitting and receiving terminals, respectively, each include a multi-stage shift register for storing information sequences are encoded at the transmitting formation signals and a parity check digit generating circuit connected to selected stages of the shift register. Unlike the above-mentioned prior art systems, however, the stages to which the parity digit generating circuit are connected are determined directly from the coefficients of a unique well-defined, easily ascertainable generator polynomial. In addition, a second generalized equation is defined which yields an orthogonalization rule for a particular code which rule directly specifies connections in the decoder required to orthogonalize the code. Specifically, the orthogonalization rule for a code directs the modulo-2 addition of the contents of specified stages of the syndrome register which addition or additions effects orthogonalization. Orthogonalization, in turn, allows decoding by means of majority voting circuitry which is cheaper and simpler to use than alternate methods.

It is, therefore, a feature of the present invention that a class of codes is defined which codes are efficient and economical to use.

It is another feature of this invention that encoding and decoding circuitry to correct almost any combination grammable to correct almost any combination of random and burst errors.

It is a further feature of the present invention that a noniterative method is utilized for specifying encoding and decoding circuitry to correct almost any combination of random and burst errors in a communication system.

It is a still further feature of this invention that apparatus is provided which is optimized for the correction of random errors.

BRIEF DESCRIPTION OF THE DRAWINGS

A complete understanding of the present invention and of the above and other objects and features thereof can be gained from a consideration of the detailed description of specific illustrative embodiments presented hereinbelow in connection with the accompanying drawings, in which:

FIG. 7 shows a table of sample codes specified in accordance with the present invention.

DETAILED DESCRIPTION

Figure 1:
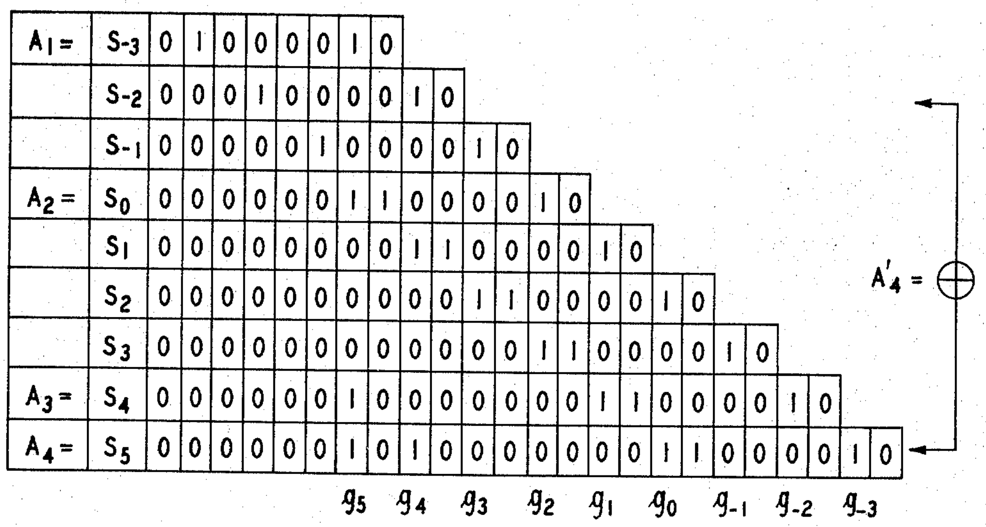
FIG. 1 shows a parity triangle for a diffuse code for correcting $t=2$, B=2 errors.

In order to facilitate the explanation of the apparatus and operation of the preferred embodiments of the present invention, it is considered helpful to first review a few brief fundamentals of the data processing arts. Clearly, however, an exhaustive tutorial presentation is not feasible. Further, it is not considered desirable to duplicate material already well documented in a number of books and publications in the art. The reason for the inclusion of these fundamentals is simply to indicate the notation used herein and perhaps, incidentally, to refresh the memory of artisans who may have forgotten them for one reason or another. In addition to the references specifically cited in the discussion below, the following publications offer considerable background material: "Coding for Error Control," by D. T. Tang and R. T. Chien, IBM Systems Journal, vol. 8, No. 1, 1969, p. 48 et seq., "A Class of Binary Recurrent Codes With Limited Error Propagation" by J. P. Robinson and A. J. Bernstein, IEEE Transactions on Information Theory, vol. IT–13 No. 1, January 1967 and "Principles of Data Communication" by R. W. Lucky, J. Salz and E. J. Weldon, Jr., McGraw-Hill, 1968. It is also noted that the abovecited IBM Systems Journal includes an extensive bibliography.

Error detecting and correcting codes of the type to which the present invention is applicable are each uniquely characterized by a generator polynominal. Generator polynomials are a well-known tool in the data processing arts for describing such codes. For a complete discussion of generator polynomials, see, for example, Error-Correcting Codes by W. W. Peterson, John Wiley and Sons and The M.I.T. Press, 1961 or J. L. Massey, Threshold Decoding, M.I.T. Press and John Wiley and Sons, Cambridge, Mass., 1963.

Because of the complex nature of the theory of generator polynominals, it suffices to say here that the generator polynomials of the codes considered characterize those codes completely. Further, for binary codes, the generator polynomials can be specified uniquely by their nonzero terms. Since a polynomial, in this case, has binar coefficients only of the dummy variable $x$, the specification of its nonzero terms is unique. For example, $g(x)=3,1,0$ simply means $g(x)=x^3+x^1+x^0$ which, in turn, is typically written as $g(x)=x^3+x+1$.

In accordance with accepted practice, then, the codes utilized in the present invention are described in terms of their generator polynomials which, in turn, are derived from so-called difference sets. Briefly, a difference set is a set of ordered integers $(N_1, N_2 \ldots N_k)$ such that all the partial sums, $$S_j=\sum_{\sigma=1}^{j} N_\sigma i \leq j$$

are distinct. For example, (1, 3, 2) forms a difference set since all partial sums of (1, 3, 2) are distinct. The partial sums are:

| | | | | | | |
|---|---|---|---|---|---|---|
| 1 | 3 | 2 | | 1 | 3 | 2 |
| 1+3 | 3+2 | | = | 4 | 5 | |
| 1+3+2 | | | | 6 | | |

The concept of difference sets can be generalized to more than one group of ordered integers. Such a difference set is called a composite difference set and has the property that the partial sums of each component difference set are all distinct. For example, (1, 2, 5) (4, 6) forms a composite difference set since the individual partial sums are distinct as shown below.

| | | | | |
|---|---|---|---|---|
| 1 | 2 | 5 | 4 | 6 |
| 3 | 7 | | 10 | |
| 8 | | | | |

Another tool useful in facilitating an understanding of the present invention is the so-called parity triangle. The parity triangle, as is well-known in the art, is a matrix derived from the coefficients of the generator polynomial.

FIG. 1 illustrates the parity triangle for the generator polynominal $g(x)=x^{-3}+1+x^4+x^5$. The $g_5$ column $x$ (including a column of information bits and a column of parity bits to the right of the information bit column) is typically referred to as the zeroth block. Each of the rows having a 1 in the formation bit column of the zeroth block is designated by a subscripted A as shown in FIG. 1. So-called feedback decoding is performed on the codes of the present invention. As a result the information bits represented by the columns to the left of the zeroth block are assumed to have been correctly decoded and can be excluded. Typically, the parity bits to the left of the zeroth block do not usually contribute to subsequent decoding and can therefore also be excluded. However, it is a feature of the codes of the present invention that the parity bits to the left of the zeroth block do contribute to the decoding of subsequent blocks and cannot therefore be excluded.

FIG. 1 illustrates the inclusion of the necessary parity bits (and information bits all zeros) to the left of the zeroth block. It is further noted at this point that there are negative numbers appearing in the check equations to be discussed below which correspond to the check bits to the left of the zeroth block of the parity triangle for the code.

As suggested above, orthogonal codes are particularly useful because they may be accurately decoded by means of majority voting schemes. Since majority voting error correction is economical, it is desirable to "orthogonalize" the codes of the present invention such that they can be decoded by means of majority voting techniques. In particular triangle (that is, no 1's in two separate rows of ticular, self-orthogonal codes have no rectangles in the parity triangle (that is, no 1's in two separate rows of the parity triangle characterizing the code which 1's define corners of a rectangle). (See J. R. Macy, "Theory of Serial Codes" (submitted in partial fulfillment of the requirements of the Master's Degree) Stevens Institute of Technology, Hoboken, N.J., 1963). Specifically, then, the object of the present invention is to produce a coding arrangement characterized by a parity triangle orthogonalized to remove any undesirable or "interfering" bits which prevent the use of threshold decoding techniques. Incidentally, these undesirable bits, of which there may be many, may be of the usual rectangle-forming variety or they may simply be bits which interfere with the correction of burst errors. In accordance with the present invention, however, it is not necessary to determine to which variety the undesirable bit or bits belong. The code and the resulting error correction arrangement automatically provide an orthogonalized, optimum system, in any case.

Briefly, then, the apparatus of one embodiment of the present invention includes an encoder in a transmitter comprising a multi-stage shift register and an exclusive-OR circuit. Selected stages of the multi-stage shift register are connected to the exclusive-OR circuit that certain combinations of information bits are added (modulo-2) to produce required check bits. In particular, the number of encoder shift register stages corresponds to the number of terms in the generator polynomial and the selected stages of the shift register correspond to the nonzero terms of that generator polynomial. A decoder in the receiver includes a multi-stage shift register and exclusive-OR circuit, like that of the encoder, for porducing a set of check bits from the transmitter via an information sequence received from the channel. The decoder further includes a syndrome circuit in combination with a majority logic circuit for correcting incorrectly received information signals in response to information derived from the recevied and locally generated check bits.

In accordance with the present invention, the connections between the multi-stage shift register and the exclusive-OR circuit in the encoder and the check generating portion of the decoder are determined from a uniquely specified relationship. Similarly, the specification of the syndrome circuit is also determined from a set of straightforward relationships.

In accordance with the preferred embodiment of the present invention an encoder and decoder are specified as follows:

(1) Assign values to $t$ and B according to the system specifications required;

(2) Construct a composite difference set $(f_1, f_2 \ldots f_{-2})$ $(k_1, k_2 \ldots k_{t-1})$. (The composite difference set may be constructed, for example, in accordance with the minimizing techniques suggested by J. Singer in an article entitled, "A Theorem in Finite Projective Geometry and Some Applications to Number Theory" appearing in the Transactions of the American Mathematical Society, vol. 43, 1938 at pages 377 to 385.)

(3) Specify the parity-generating circuitry by calculating the nonzero terms of the generator polynomial $g(x)$ as follows:

$$-(B+M)O, f_1 f_1+f_2, \ldots \sum_{i=1}^{t-2} f_{i,z}$$

$$z+k_1, z+k_1+k_2, \ldots z+\sum_{i=1}^{t-1} k_i$$

where $$z=2B+M-m+\sum_{i=1}^{t-2} f_i$$

and where $$M=\overset{\max}{0\leq j\leq t_2}\left\{\sum_{i=1}^{j+1}(k_i-f_{r_j})\right\}$$

$$m=\overset{\min}{1\leq i\leq t-1}\left\{\sum_{j=1}^{i}(k_i-f_{j-1})\right\}$$

and where $$O\overset{D}{\equiv}f_{r_0}<f_{r_1}<\ldots f_{r_{i-2}}$$

is simply a reordering of the set $(f_1, f_2, f_3 \ldots f_{t-2})$. It is also required that $B\geq B_m$ where $$B_m=\text{Max}\left\{M+1, \sum_{i=1}^{t-2} f_i-M+1, \sum_{i=1}^{t-1} k_i-M+4\right\}$$

(4) Specify the connections between the syndrome register and the majority logic circuit from the following orthogonalization rules:

The signals for syndrome register stage No. $(Z+k_i)$th are modified by adding the signals from stages numbered $$-x+\sum_{\sigma=j}^{i} k\sigma,\ j=1, 2, \ldots i$$

where $$x=B+M$$

An example will best serve to illustrate the specification of an encoder and decoder in accordance with the preferred embodiment of the present invention. Thus, let the random error correcting capability $t$, be arbitrarily chosen to be 3. Obviously there is only one term in the set $(f_1, f_2 \ldots f_t)$ since $t-2=3-2=1$. Similarly, there are only two terms in the set $(k_1, k_2 \ldots k_{t-1})$. The members of these sets which form a composite difference set are chosen such that $$f_1=(2) \text{ and } (k_1, k_2)=(1,3)$$

It then follows that $$M=\max\{1, (4-2)\}=2$$

$$m=\min\{1, 2\}=1$$

$$\Sigma f=f_1=2$$

and $$\Sigma k=k_1+k_2=1+3=4$$

In addition, $$B_m=\max\{(2+1), (4-2+1), (2-2+1)\}=3 \text{ and}$$

$$Z=2B+2-1+2=2B+3$$

Thus, $$g(x)=(B+2), 0, 2, 2B+3, 2B+4, 2B+7$$

Further the signals in the $(Z+k_1)$th=

$$(2B+3+1)\text{th}=(2B+4)\text{th stage}$$

and the $$(Z+k_2)\text{th}=(2B+3+4)\text{th}=(2B+7)\text{th stage}$$

are modified respectively, by the addition thereto of the signals in the $$(-(B+M)+k_1)\text{th}=(-(B+2)+1)\text{th}=(-B-1)\text{th stage}$$

and the $$(-(B+M)+3)\text{th}=(-B+1)\text{th}$$

and the $$(-(B+M)+4)\text{th}=(-B+2)\text{th stage}$$

A system for correcting $t=3$ random errors and, say, B=3 burst errors can be constructed from the above information. For example, for B=3, $$g(x)=-(5), 0, 2, 9, 10, 13$$

Figure 2:
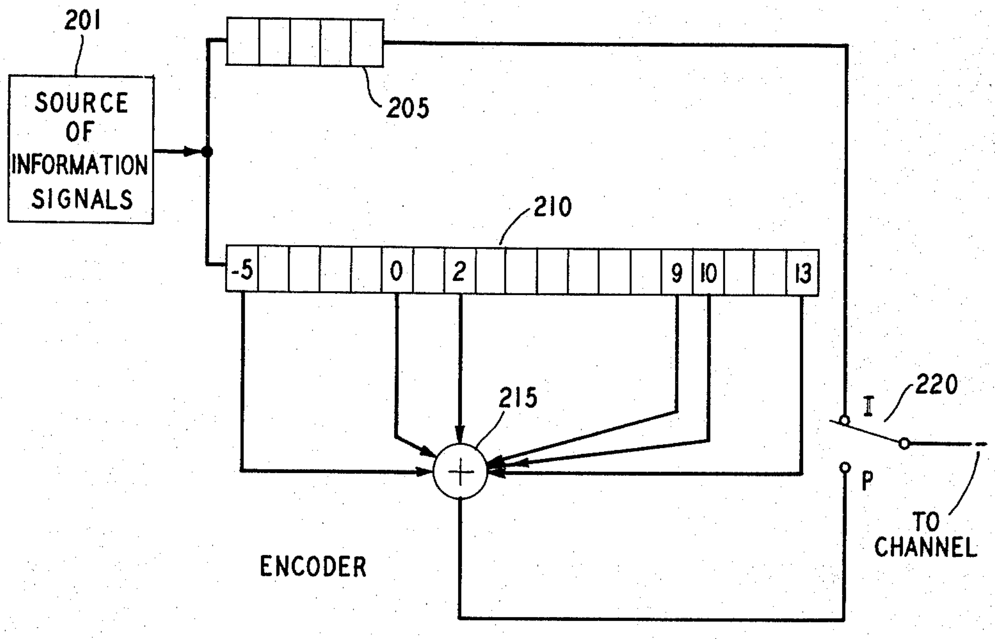
FIG. 2 shows an encoder for an illustrative preferred embodiment of the present invention.

The encoder for a code in accordance with the preferred embodiment of the present invention having a generator polynomial as specified above is shown in FIG. 2.

As seen in FIG. 2, information signals generated by the source of information signals 201 are simultaneously applied to delay register 205 and the shift register 210. Delay register is seen from FIG. 2 to be $B+M$ stages long. The significance of the delay register 205 is apparent from the generator polynomial, the leftmost term of which is $-(B+M)$. That is, the information signals must be delayed $B+M$ bits in order to provide the terms necessary to the complete specification of the generator polynominal with which they are associated. As discussed above the number of stages of shift register 210 corresponds to the number of terms of the generator polynomial. In addition to which, certain stages of shift register 210 are connected to an exclusive-OR circuit, in this case, exclusive-OR circuit 215. The stages chosen correspond to the nonzero terms of the generator polynomial when each term of the generator polynomial from left to right is associated with a stage of the shift register counting from left to right. Switch 220 in FIG. 2, controlled by clock circuitry (not shown), intersperses the information signals with the parity signals generated by exclusive-OR circuit 215.

In order to specify the decoder for correcting errors in a data stream encoded by the encoder shown in FIG. 2, it is also necessary to specify the orthogonalization rules for the codes. Thus, for $t=3$, $B=3$, the orthogonalization rules state that the $(Z+k_1)$th$=(2B+4)$th$=10$th stage must be modified by adding the signals in the $$(-B-1)\text{th}=(-4)\text{th stage}$$

Similarly, the signals in the $(2B+7)$th$=(13)$th stage must be modified by adding the signals in the $$(-B+1)\text{th}=(-2)\text{th}$$

and $(-B+2)$th$=(-1)$th stages. The decoder for correcting errors in this code is shown in FIG. 3.

Figure 3:
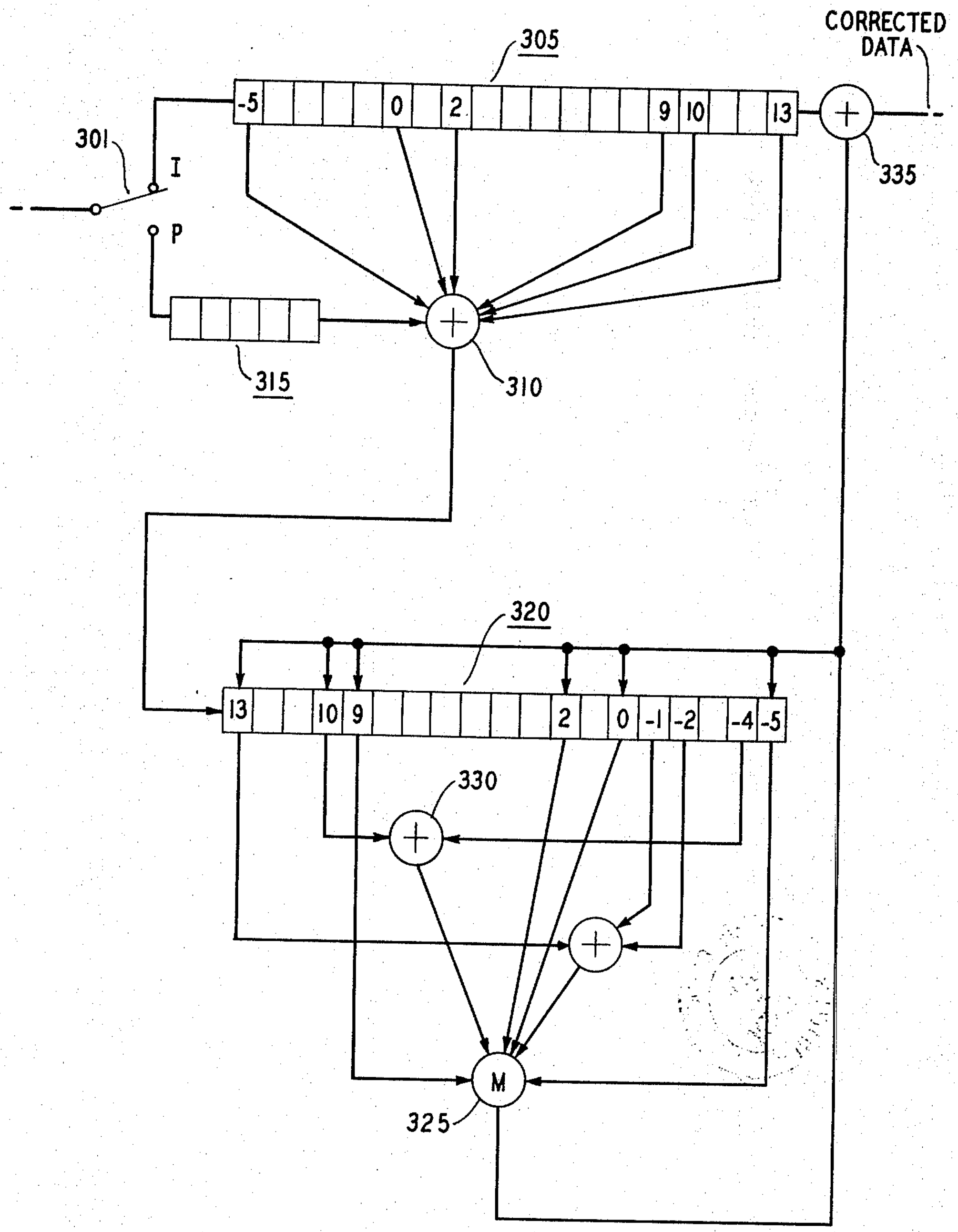
FIG. 3 shows the decoder for the illustrative embodiment of FIG. 2.

The decoder of FIG. 3 includes a parity generating circuit similar to the encoder of FIG. 2. In particular, switch 301 applies data signals to register 305 having similar connections to exclusive-OR circuit 310 as shift register 210 has to exclusive-OR circuit 215 of FIG. 2. In addition, shift register 315 delays the parity signals by $B+M$ bits, the number of negative terms (having both zero and nonzero coefficients) of the generator polynomial. The parity signals generated by exclusive-OR circuit 310 are applied to syndrome register 320. The connections between the selected stages of syndrome register 320 and majority logic circuit 325 are the same as those between shift register 305 and exclusive-OR circuit 310 modified, as indicated, by the orthogonalization rules. Thus, stage 9 is connected directly to majority logic circuit 325 while the contents of stages 10 and $-4$ are added by means of exclusive-OR circuit 330 before application to majority logic circuit 325 as specified by the orthogonalization rules calculated above for this illustrative circuit. The output from majority logic circuit 325 is applied in feedback fashion to the stages indicated in FIG. 3 in accordance with the principles taught in the above-cited Massey reference. In addition, the output from majority logic circuit 325 is also applied to exclusive-OR circuit 335 to be added (modulo-2) to the information bits shifted from register 305 to effect correction of those information bits which are in error. The output from exclusive-OR circuit 335 is a corrected stream of information signals.

FIGS. 2 and 3 illustrate an encoder and decoder in accordance with the principles of the preferred embodiment of the present invention for correcting $t=3$, $B=3$ errors. In order to facilitate an understanding of the apparatus of the present invention, a simple encoder will be generated and the progress of an illustrative data stream traced through the system. To begin, assume it is required that error correcting apparatus be designed for equipment typically experiencing 2 random errors and 2 blocks of burst errors 2 bits in length: in short, $t=2$, $B=2$.

From FIG. 7, which includes a table of illustrative codes, it is seen that for $t=3$, $B=3$, the generator polynomial is $(-3)$, 0, 4, 5 and the orthogonalization rule specifies that the contents of syndrome register stage No. 5 must be added (modulo-2) to the contents of syndrome stage No. $(-2)$ before application to the majority logic circuit.

Figure 4:
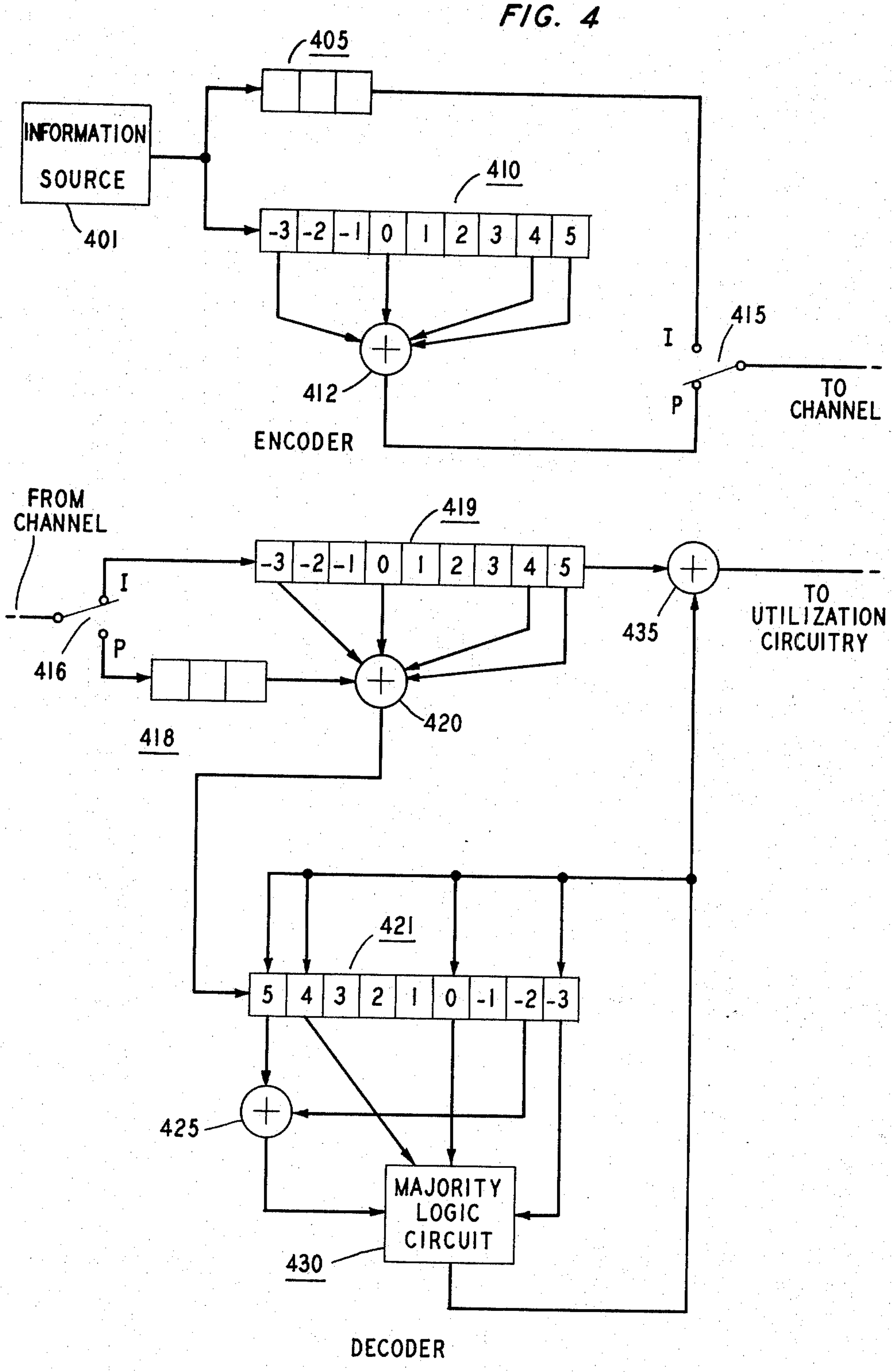
FIG. 4 shows an encoder and decoder for a different illustrative circuit in accordance with the principles of the present invention.

FIG. 4 illustrates the encoder for correcting $t=3$, $B=3$ errors in accordance with the preferred embodiment of the present invention. As with the illustrative arrangement of FIG. 3, the information source 401 of FIG. 4 applies signals, delayed by register 405, to the channel via switch 415 and simultaneously applies information signals directly to shift register 410. The connections between register 410 and exclusive-OR circuit 412 are determined from nonzero terms of the generator polynomial. Similarly, the connections between register 419 and exclusive-OR circuit 420 in the decoder are also determined by the nonzero terms of the generator polynomial such that information signals received from the channel via switch 416 generate parity signals in the same manner as the information signals generated by informaiton source 401 did in the encoder. Register 418, in turn, provides the necessary delay to synchronize the received and locally generated parity signals. Syndrome register 421 stores the syndrome signals generated by exclusive-OR circuit 420 and exclusive-OR circuit 425 combines the signals in syndrome register 421 as designated by the orthogonalization rules (calculated as outlined above or as read from FIG. 7). Lastly, majority logic circuit 430 generates the signals required for correcting (via exclusive-OR circuit 435) information signals as they emerge from shift register 419.

Figures 5, 6:
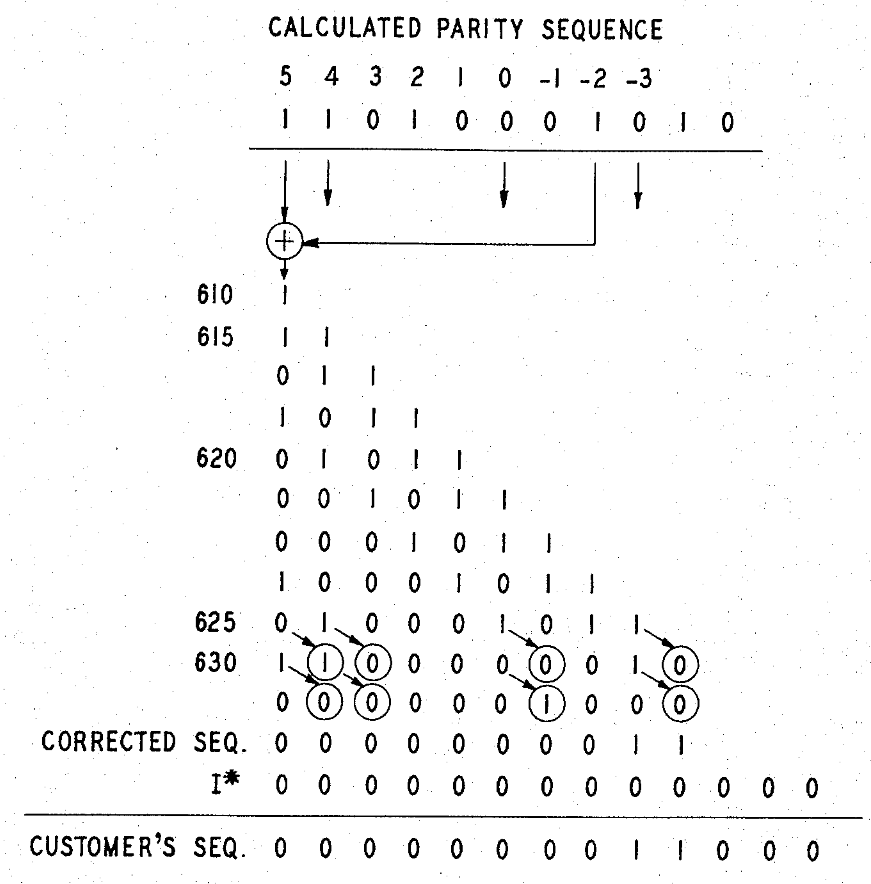
FIG. 5 shows illustrative information and parity streams before and after the introduction of errors.
FIG. 6 illustrates the correction of errors in the information stream of FIG. 5 by a circuit such as that shown in FIG. 4.

FIG. 5 shows an illustrative sequence of information signals, I, which might be generated by source 401 of FIG. 4 and the parity sequence, P, generated by exclusive-OR 412 in response to the sequence I. FIG. 5 also illustrates a hypothetical received information sequence, I*, into which errors (boxed in FIG. 5) have been introduced and the parity sequence, P*, also recived in error.

FIG. 6 illustrates the correction of errors in the incorrectly received information sequence of FIG. 5 by the decoder of FIG. 4. In particular, FIG. 6 shows the syndrome sequence (which is the same as the received parity sequence since the erroneously received information stream includes only zeros) as it progresses through the syndrome register 420. That is, the first syndrome bit shifted into the leftmost stage of syndrome register 421 is shown on line 610 of FIG. 6. Similarly during the next shift, the bits shown on line 615 occupy the two leftmost stages of syndrome register 421 and so on. In addition, the arrows above selected columns of data bits in FIG. 6 indicate those stages of syndrome register 421 which are directly connected to majority logic circuit 430. In addition, an encircled plus sign and two arrows signify the two stages, the signals in which are added prior to application to majority logic circuit 430. By way of example, line 620, in FIG. 6, shows the contents of the leftmost five stages of syndrome register 421 after the fifth shifting of that register. Looking at line 620, it is clear that there is only a single 1 applied to majority logic circuit 430; hence the output from that circuit is 0. Clearly, then, the information signal in the rightmost stage of register 410 is transmitted unchanged and the signals in stages 5, 4, 0 and $(-3)$ of syndrome register 421 are not inverted. From line 625, however, it is apparent that there are four 1's applied to majority logic circuit 430. As a result, the output from majority logic circuit 430, that is, a logic 1, inverts the information signal shifted out to the channel by means of exclusive-OR circuit 435. Simultaneously the feedback connection causes inversion of the signals in the stages receiving a feedback signal. This inversion is illustrated by arrows between rows 625 and 630 of FIG. 6 and the inverted bits are encircled. Again, line 630 reveals that there are three 1's (a majority) applied to majority logic circuit 430. Once again, the appropriate syndrome bits are inverted as well as is the information bit being shifted out to the channel. The row labelled "correcting sequence" illustrates the two 1's generated by the majority logic circuit as a result of the sequences shown in rows 625 and 630. Clearly, the customer's sequence—the corrected information sequence—is a duplicate of that transmitted and the circuit of FIG. 4 has been shown to correct the indicated burst error of two bits.

Although the exemplary arrangement described above was specified in terms of the correction of random errors, it is obvious from the foregoing that the same procedure is used to derive circuitry wherein the burst error correction capability is specified initially.

As indicated above, FIG. 7 includes in tabular form a number of codes which have been specified in accordance with the preferred embodiment of the present invention. In FIG. 7, $n_e$ and $N_A$ are well-known designations for the error correcting capability and the size of the apparatus specified by the codes to which they apply. In addition the $B_m$ entries in the table of FIG. 7 indicate the minimum B required for such code to exist.

It is to be understood that the above-described arrangements are only illustrative of the application of the principles of the present invention. Numeronus other arrangements may be devised by those skilled in the art without departing from the spirit and scope of the invention.

What is claimed is:

1. In a data communication system including a transmitter, a receiver and an interconnecting channel apparatus in said transmitter for correcting errors in a stream of data signals, generated by a source of data signals, in acocrdance with a *t*-random error and B-burst error-correcting code, comprising (a) an encoder multi-stage shift register for storing signals generated by said source of data signals said multi-stage shift register having as many stages as there are terms in the generator polynomial defining said code each of said stages corresponding, in an ordered relationship, to a term of said generator polynomial and wherein the nonzero terms of said generator polynomial are specified as follows:

$$-(B+M),\ O,\ f_1,\ f_1+f_2,\ \ldots \sum_{i-1}^{t-2} f_i,\ Z$$

$$Z+k_1,\ Z+k_1+k_2,\ \ldots\ Z+\sum_{-i1}^{t-1} k_i$$

where $$(f_1, f_2, f_3 \ldots f_{t-2})(k_1, k_2, k_3 \ldots k_{t-1})$$

is a composite difference set, $$Z=2B+M-m+\sum_{i=1}^{t-2} f_1$$

$$M=\overset{\max}{0\leq j\leq t-2} \sum_{i-1}^{j+1} \left(k_1-f_{r_j}\right)$$

$$m=\overset{\min}{1\leq i\leq t-1} \sum_{j=1}^{i} \left(k_i-f_{j-i}\right)$$

and where $$O \overset{D}{=} f_{r_0} < f_{r_1} < \ldots f_{r_{i-2}}$$

is simply a reordering of the set $(f_1, f_2, f_3 \ldots f_{t-2})$, (b) an encoder logic circuit for combining, in a specified manner to produce a first set of check signals, signals stored in those stages of said multi-stage shift register which correspond to said nonzero terms of said generator polynomial, (c) means responsive to said source of data signals and said encoder logic circuit for interspersing said data signals with said check signals and for transmitting said interspersed signals to said receiver.

2. Apparatus as in claim 1 further comprising a decoder at said receiver, including (a) a decoder multi-stage shift register for storing data signals received from said channel said decoder shift register having as many stages as there are terms in said generator polynomial, each of said stages corresponding in an ordered relationship to a term of said generator polynomial, (b) a decoder logic circuit for combining, in a specified manner to produce a second set of check signals, signals stored in those stages of said decoder multi-stage shift register which correspond to said nonzero terms of said generator polynomial, (c) comparing means for generating a first syndrome signal when corresponding ones of said first and second sets of check signals are the same and for generating a second syndrome signal when corresponding ones of said first and second sets of check signals are different, (d) a syndrome register for storing as many syndrome signals as there are terms of said generator polynomial, said syndrome register stages bearing an ordered relationship to the terms of said generator polynomial, and (e) means for logically combining the signals stored in designated stages of said syndrome register corresponding to the $(Z+k_1)$th term of the generator polynomial and the $$\left(-x+\sum_{=j}^{i} k_0\right)\text{th}$$

term thereof, where $j=1, 2, \ldots i$, and $$x=B+M$$

and wherein said designated stages include stages corresponding to zero and nonzero terms of said generator polynomial.

3. Apparatus as in claim 2 further comprising majority voting means responsive to signals from said means for logically combining and responsive to signals in the remaining ones of said syndrome register stages corresponding to said nonzero terms of said generator polynomial for generating a first indication signal when the majority of signals applied to said majority voting means are of a first logic level and for generating a second indication signal when the majority of signals applied to said majority voting means are of a second logic level.

4. Apparatus as in claim 3 wherein said encoder and decoder logic circuits each comprises an exclusive-OR circuit.

5. Apparatus as in claim 4 wherein said comparing means comprises at least one exclusive-OR circuit.

6. Apparatus as in claim 5 further comprising means for inverting signals in said syndrome register stages corresponding to said nonzero terms of said generator polynomial in response to said indication signals from said majority voting means.

7. Apparatus as in claim 6 further comprising means for inverting selected ones of said data signals stored in said decoder multi-stage shift register.

8. A method for correcting errors in a stream of binary data signals processed by a communication system having an encoder, a decoder and a connecting channel, comprising the steps of (a) encoding said data signals in accordance with a code specified by a generator polynomial having nonzero terms as follows:

$$-(B+M),\ O,\ f_1,\ f_1+f_2,\ \ldots\ \sum_{i=1}^{t-2} f_i,\ Z$$

$$Z+k_1,\ Z+k_1+k_2,\ \ldots\ Z+\sum_{i=1}^{t-1} k_i$$

where $$(f_1, f_2, f_3 \ldots f_{t-2})(k_1, k_2, k_3 \ldots k_{t+1})$$

is a composite difference set, $$Z=2B+M-m+\sum_{i=1}^{t-2} f_i$$

$$M=\max_{O\leq j\leq t-2}\sum_{i=1}^{j+1}(k_i-f_{r_j})$$

$$m=\min_{1\leq i\leq t-1}\sum_{j=1}^{i}(k_i-f_{j-1})$$

and where $$O\stackrel{D}{=}f_{r_0}<f_{r_1}<\ \ldots\ f_{r_{i-2}}$$

is simply a reordering of the set $(f_1, f_2, f_3 \ldots f_{t+2})$, wherein said step of encoding comprises the steps of (i) storing a number of consecutive data signals equal to the number of terms (nonzero or otherwise) of said generator polynomial, said data signals bearing an ordered relationship to the terms of said generator polynomial, (ii) adding, in accordance with the rules of exclusive-OR addition, those data signals corresponding to the nonzero terms of said generator polynomial to derive a number of check signals, (b) transmitting said data signals and said check signals to said decoder by means of said channel.

9. A method as in claim 8 further including the steps of (a) generating check signals from said received data signals wherein said step of generating check signals comprises the steps of (i) storing in consecutive order as many of said received data signals as there are terms in said generator polynomial, said stored data signals bearing a fixed ordered relationship to the terms of said generator polynomial, (ii) adding, in accordance with the rules of exclusive-OR addition, those stored data signals corresponding to the nonzero terms of said generator polynomial, (b) adding, in accordance with the rules of exclusive-OR addition, those check signals received from said channel to those check signals generated from said received data signals to derive a set of syndrome signals, (c) storing consecutively as many of said syndrome signals as there are terms of said generator polynomial, said stored syndrome signals bearing a fixed ordered relationship to the terms of said generator polynomial, (d) selectively combining those of said syndrome signals corresponding to the $$(Z+k_1)\text{th}$$

term and the $$\left(-x+\sum_{\sigma=j}^{i} k_\sigma\right)\text{th}$$

term of said generator polynomial where $j=1, 2, \ldots i$ and $x=B+M$, (e) generating a first indication signal when the majority of the signals produced during said step of combining are a first logic level, and generating a second indication signal when said majority of signals are a second logic level, and (f) inverting selected ones of said stored received data signals in response to said first and second indication signals.

References Cited

UNITED STATES PATENTS

| | | | |
|---|---|---|---|
| 3,227,999 | 6/1962 | Hagelbarger | 340—146.1 AQ |
| 3,447,132 | 5/1969 | Kohlenberg | 340—146.1 AQ |
| 3,571,795 | 3/1971 | Tong | 340—146.1 AQ |
| 3,593,282 | 7/1971 | Tong | 340—146.1 AQ |
| 3,605,090 | 9/1971 | Burton | 340—146.1 AQ |

CHARLES E. ATKINSON, Primary Examiner